(12) United States Patent
Voronin et al.

(10) Patent No.: US 10,814,336 B2
(45) Date of Patent: Oct. 27, 2020

(54) APPARATUS FOR TREATING GAS

(71) Applicant: Edwards Limited, Burgess Hill, West Sussex (GB)

(72) Inventors: Sergey Alexandrovich Voronin, Delmar, NY (US); Mark James Attwood, Somerset (GB); Andrew Arthur Chambers, Somerset (GB); John Leslie Bidder, Burgess Hill (GB)

(73) Assignee: Edwards Limited, Burgess Hill, West Sussex (GB)

( * ) Notice: Subject to any disclaimer, the term of this patent is extended or adjusted under 35 U.S.C. 154(b) by 330 days.

(21) Appl. No.: 15/552,715

(22) PCT Filed: Jan. 28, 2016

(86) PCT No.: PCT/GB2016/050182
§ 371 (c)(1),
(2) Date: Aug. 22, 2017

(87) PCT Pub. No.: WO2016/135438
PCT Pub. Date: Sep. 1, 2016

(65) Prior Publication Data
US 2018/0071751 A1    Mar. 15, 2018

(30) Foreign Application Priority Data
Feb. 23, 2015 (GB) .................. 1502964.8

(51) Int. Cl.
*B03C 3/80* (2006.01)
*B03C 3/16* (2006.01)
(Continued)

(52) U.S. Cl.
CPC ............... *B03C 3/80* (2013.01); *B03C 3/01* (2013.01); *B03C 3/16* (2013.01); *B03C 3/36* (2013.01);
(Continued)

(58) Field of Classification Search
CPC combination set(s) only.
See application file for complete search history.

(56) References Cited

U.S. PATENT DOCUMENTS 3,238,702 A * 3/1966 De Seversky ............ B03C 3/16
                                                    96/45
4,093,430 A * 6/1978 Schwab .................... B03C 3/16
                                                    310/10
(Continued)

FOREIGN PATENT DOCUMENTS

| CN | 102513210 A | 6/2012 |
| CN | 103732307 A | 4/2014 |

(Continued)

OTHER PUBLICATIONS

British Search Report and Examination Report dated Aug. 24, 2015 for corresponding British Application No. GB1502964.8.
(Continued)

*Primary Examiner* — Christopher P Jones
*Assistant Examiner* — Sonji Turner
(74) *Attorney, Agent, or Firm* — Theodore M. Magee; Westman, Champlin & Koehler, P.A.

(57) ABSTRACT

Known wet electrostatic precipitators are large and inefficient. The present invention enables the production of smaller, more efficient and long lasting wet electrostatic precipitators by the addition of a central bore in the inner electrode through which a first purge flow is passed and directed into the precipitator chamber, perpendicular to the direction of flow of the gas to be treated through the chamber to urge the particulate into the water curtain. A second, larger, cleaning purge flow is also provided to disturb the water curtain such that it cleans the inner electrode of any deposited particulate.

12 Claims, 7 Drawing Sheets

(51) Int. Cl.
*B03C 3/36* (2006.01)
*B03C 3/01* (2006.01)
*B03C 3/41* (2006.01)
*B03C 3/49* (2006.01)

(52) U.S. Cl.
CPC ............ *B03C 3/41* (2013.01); *B03C 3/49* (2013.01); *B03C 2201/08* (2013.01); *B03C 2201/10* (2013.01)

(56) References Cited

U.S. PATENT DOCUMENTS

| | | | | |
|---|---|---|---|---|
| 4,110,086 | A * | 8/1978 | Schwab | B03C 3/16 95/64 |
| 4,388,089 | A * | 6/1983 | Reif | B03C 3/16 261/112.1 |
| 4,529,418 | A * | 7/1985 | Reif | B03C 3/53 261/112.1 |
| 6,106,592 | A * | 8/2000 | Paranjpe | B03C 3/53 95/65 |
| 7,378,062 | B2 * | 5/2008 | Itatani | B01D 53/323 422/186.04 |
| 8,790,444 | B2 * | 7/2014 | Ellis | B01D 53/1456 95/65 |
| 9,821,320 | B2 * | 11/2017 | Ellis | B01D 53/1456 |
| 2014/0209575 | A1 * | 7/2014 | Voronin | B01D 53/323 219/121.51 |
| 2014/0334982 | A1 | 11/2014 | Voronin et al. | |

FOREIGN PATENT DOCUMENTS

| | | |
|---|---|---|
| EP | 2641659 A1 | 9/2013 |
| GB | 1049470 | 11/1966 |
| GB | 2493750 A | 2/2013 |
| GB | 2493752 A | 2/2013 |
| JP | H01104357 A | 4/1989 |
| JP | H11000580 A | 1/1999 |
| JP | 2015502249 | 1/2015 |
| WO | 2007048998 A1 | 5/2007 |
| WO | 2011162023 A1 | 12/2011 |
| WO | 2012147387 A1 | 11/2012 |
| WO | WO-2012147387 A1 * | 11/2012 ............ B03C 3/361 |

OTHER PUBLICATIONS

PCT International Search Report and Written Opinion dated Apr. 29, 2016 for corresponding PCT Application No. PCT/GB2016/050182.

Chinese Office Action dated Jul. 17, 2018 and Chinese Search Report dated Jul. 19, 2018 for corresponding Chinese Application No. 201680011717.3.

Japanese Notification of Reason for Rejection dated Oct. 7, 2019 for corresponding Japanese Application No. 2017-543813.

* cited by examiner

US 10,814,336 B2

APPARATUS FOR TREATING GAS

CROSS-REFERENCE TO RELATED APPLICATION

This application is a Section 371 National Stage Application of International Application No. PCT/GB2016/050182, filed Jan. 28, 2016, which is incorporated by reference in its entirety and published as WO 2016/135438 A1 on Sep. 1, 2016 and which claims priority of British Application No. 1502964.8, filed Feb. 23, 2015.

FIELD

The embodiments relate to apparatus for treating gas, and finds particular use in the treatment of gas containing solid particles, such as $SiO_2$, and acidic gases, such as HCl. More specifically, the embodiments relate to an improved electrostatic precipitator.

BACKGROUND

The removal of solid particles from gas streams is required for example in epitaxial deposition processes which are increasingly used for high-speed semiconductor devices, both for silicon and compound semiconductor applications. An epitaxial layer is a carefully grown, single crystal silicon film. Epitaxial deposition utilizes a silicon source gas (precursor), typically silane or one of the chlorosilane compounds, such as trichlorosilane or dichlorosilane, in a hydrogen atmosphere at high temperature, typically around 800° to 1100° C., and under vacuum conditions. Epitaxial deposition processes are often doped with small amounts of boron, phosphorus, arsenic, germanium or carbon, as required, for the device being fabricated. Etching gases supplied to a process chamber may include halocompounds such as HCl, HBr, $BCl_3$, $Cl_2$ and $Br_2$, and combinations thereof. Hydrogen chloride (HCl) or another halocompound, such as $SF_6$, or $NF_3$, may be used to clean the chamber between process runs.

In such processes, only a small proportion of the process gases supplied to the process chamber are consumed within the chamber, and so a high proportion of the gas supplied to the chamber is exhausted from the chamber, together with solid and gaseous by-products from the processes occurring within the chamber.

Before the waste stream is vented into the atmosphere, it is treated to remove selected gases and solid particles therefrom. Acid gases such as HF and HCl are commonly removed from a gas stream using a packed tower scrubber, in which the acid gases are taken into solution by a scrubbing liquid flowing through the scrubber. Silane is pyrophoric, and so before the waste stream is conveyed through the scrubber it is common practice a waste stream comprising silane to be conveyed through a thermal incinerator to react silane or other pyrophoric gas present within the waste stream with an oxidant such as air. Any perfluorocompounds such as $NF_3$ may also be converted into HF within the incinerator.

When silane burns, large amounts of silica ($SiO_2$) particles are generated. Whilst many of these particles may be taken into suspension by the scrubbing liquid within the packed tower scrubber, it has been observed that the capture of relatively smaller particles (for example, having a size less than 1 micron) by the scrubbing liquid is relatively poor. In view of this, it is known to provide an electrostatic precipitator downstream from the scrubber to remove these smaller particles from the waste stream.

FIG. 7 illustrates a known wet electrostatic precipitator 100 for removing solid particulates from a gas stream. The electrostatic precipitator contains an electrostatic chamber 102 having a centrally located, inner electrode 104 and an outer electrode 106 concentric to and surrounding the inner electrode and which may be provided by an electrically conducting wall of the chamber 102. The electrostatic chamber 102 also has a water inlet 108 to which a flow of water 110 is supplied to produce a "curtain" of water 112 flowing downwards around the inner surface of the outer electrode 106. A gas stream to be treated 114 is conveyed into the electrostatic chamber through inlet 116 and treated gas stream 118 is conveyed from the chamber.

During use, a high voltage is applied to the inner electrode 104 to produce an electrostatically charged field, or corona, between the inner and outer electrode of the electrostatic chamber 102. As the gas passes through the corona, any particulates contained in the gas become electrically charged and are drawn towards the outer electrode 106, where the particulates enter the water curtain 112 and are removed from the gas stream.

The various embodiments seek to provide an improved wet electrostatic precipitator.

The discussion above is merely provided for general background information and is not intended to be used as an aid in determining the scope of the claimed subject matter. The claimed subject matter is not limited to implementations that solve any or all disadvantages noted in the background.

SUMMARY

One embodiment provides a wet electrostatic precipitator for treating a gas stream, comprising an electrostatic chamber having an inlet through which a gas stream to be treated is conveyed into the chamber and an outlet through which the treated gas stream is conveyed from the chamber, an inner electrode and an outer electrode arranged to produce an electrostatically charged field therebetween when a high electrical potential is applied between said inner and outer electrodes, a liquid inlet for conveying liquid into the chamber for providing a liquid curtain over an inner surface of the outer electrode, such that particulates in the gas stream become electrically charged when passing through the field and are drawn towards the outer electrode, where they are entrained by the liquid curtain and removed from the gas stream, wherein the inner electrode comprises a conduit through which a purge gas can be conveyed and said inner electrode further comprises at least one opening located towards the chamber inlet arranged to convey purge gas from the conduit into the chamber generally laterally to the flow of the gas stream through the chamber.

By the various embodiments, an improved level of gas stream treatment is achieved with lower maintenance period required for the wet electrostatic precipitator device.

Further embodiments are as set out below and as defined in the claims.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

In order that the embodiments may be well understood, some embodiments thereof, which are given by way of example only, will now be described with reference to the accompanying drawings, in which.

DESCRIPTION OF THE EMBODIMENTS

Figure 1:
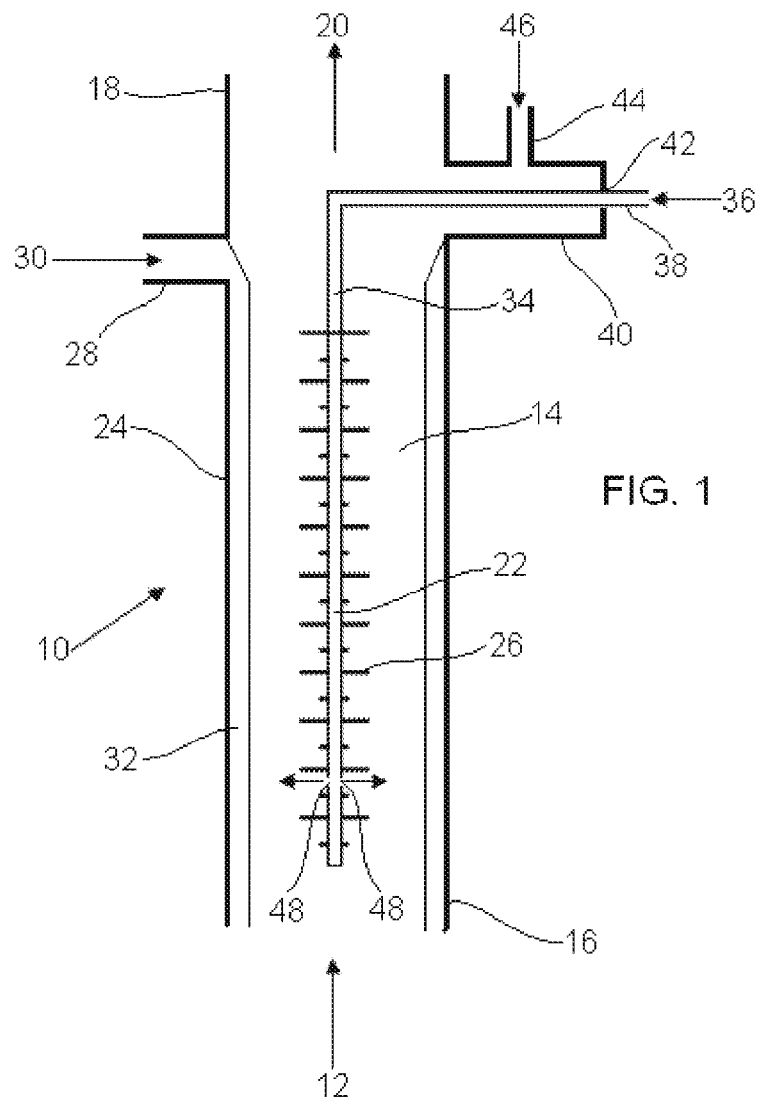
FIG. 1 shows schematically a wet electrostatic precipitator according to one embodiment.

Referring to FIG. 1, a wet electrostatic precipitator 10 is shown for treating a gas stream 12. The precipitator comprises an electrostatic chamber 14 having an inlet 16 through which the gas stream to be treated is conveyed into the chamber and an outlet 18 through which the treated gas stream 20 is conveyed from the chamber. Treatment in the present example involves the removal of particulates from the gas stream. An inner electrode 22 and an outer electrode 24 are arranged to produce an electrostatic field therebetween when a high electrical potential is applied to the inner electrode. A high electrical potential may be in the region of 1 kV, although other electrical potentials may be suitable depending on the characteristics of the gas stream and the particulates, particularly particulate size. The outer electrode provides a generally cylindrical inner surface of the electrostatic chamber 14. The inner electrode is also generally cylindrical and hollow, and is described in more detail below. Protrusions 26 extend generally laterally from the hollow cylindrical body. Electrical charge concentrates around the extremities of the protrusions and therefore the protrusions increase the localised electrostatic field for a given potential supplied to the electrode. The inner and outer electrodes are made of electrically conductive materials, typically a metal or metal alloy. It is also possible for the outer electrode to comprise the liquid film in contact with a conductive ring wherein the liquid film runs down a non-conductive tube and provides the outer electrode around the inner electrode.

A liquid inlet 28 conveys liquid, typically water, 30 into the chamber 14 for providing a liquid curtain, or weir, 32 over an inner surface of the outer electrode 24. The particulates in the gas stream become electrically charged when passing through the electrostatic field and are drawn towards the outer electrode, where they are entrained by the liquid curtain and removed from the gas stream.

As indicated above, the inner electrode is hollow and may be formed by a metallic pipe. The pipe forms a duct, or conduit, 34 along which a purge gas 36 can be conveyed through an inlet 38. The purge gas may be, for example, nitrogen or clean dry air. In the illustrated arrangement, an opposing end portion of the pipe is closed. The chamber 14 comprises a side passage 40 extending generally laterally from the main flow path of the gas stream 12. The side passage has an opening 42 at an end thereof distal from the main flow path. The inner electrode 22 extends through the opening, along the side passage and turns generally through a right angle to extend along the main part of the chamber 14. The side passage 40 is maintained generally dry and therefore even though in use it is at a high electrical potential, electrical breakdown and surface discharge in a wet environment is avoided. The side passage 40 also comprises a second opening 44 forming an inlet for purge gas 46 for conveying into the side passage a relatively small flow rate of purge gas. This small flow rate keeps the side passage contact clean and dry, thereby further reducing the possibility of parasitic surface discharge.

Figure 2:
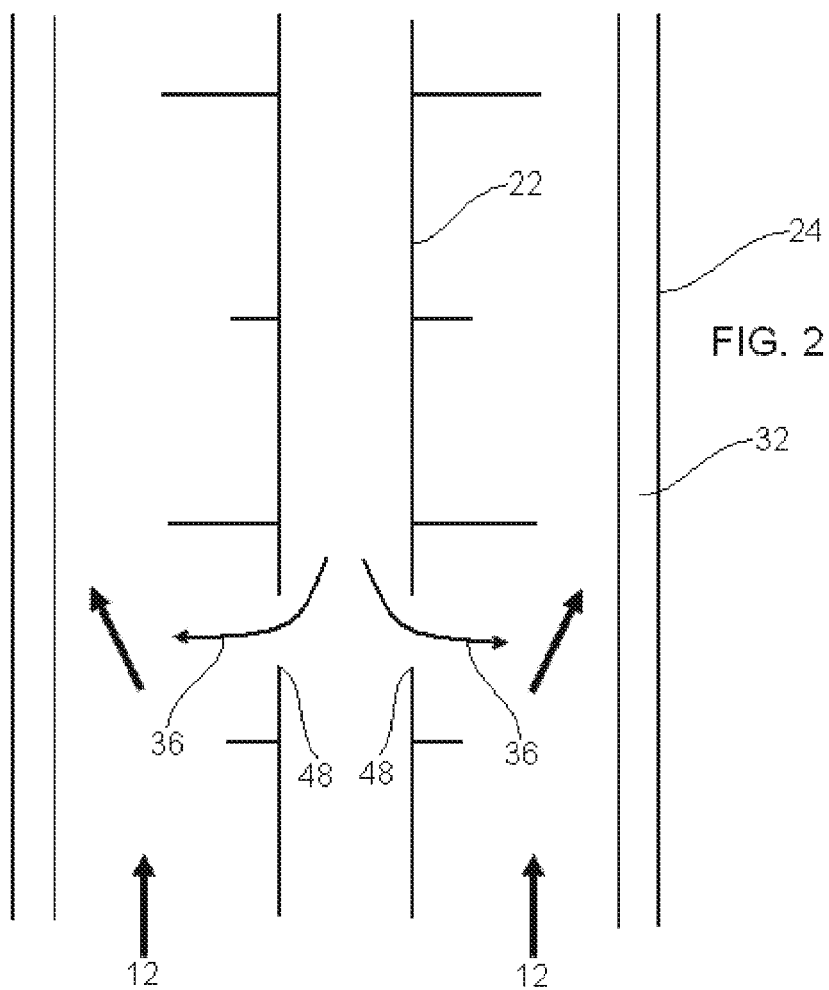
FIG. 2 shows an enlarged section of the precipitator according to one embodiment.

As shown in more detail in the enlarged section of the apparatus is FIG. 2, the duct 34 of the inner electrode 22 comprises at least one opening 48 arranged to convey purge gas 36 from the duct into the chamber 14 generally laterally to the flow of the gas stream through the chamber for directing the gas stream towards the outer electrode. In the illustrated embodiment, two openings 48 are shown and additional opening may be provided to convey purge gas from the duct in directions into and out of the plane of the drawing. The flow of purge gas through the openings 48 disrupts the gas stream to be treated 12 and generates flow of said gas stream towards the outer electrode. The disruption of flow allows greater interaction between the particulates in the gas stream to be treated and the electrostatic field thereby increasing the amount of particulates which will be entrained in the water weir 32. Additionally, the purge gas physically directs particulates in the gas stream to be treated towards the water weir for entrainment.

In this embodiment, the openings are apertures in the pipe and the pressure of purge gas in the pipe causes purge gas to escape through the openings at an angle of about 90° to the main flow of the gas stream as shown by the two arrows extending from the openings. The openings may be formed by drillings in the pipe or in another arrangement, the openings may be formed by a break in the pipe.

The provision of a gas-dynamic Wet ElectroStatic Precipitator (WESP) having additional flow of purge gas generally laterally into the electrostatic chamber increases the amount of particulates that can be removed from the gas stream and therefore increases apparatus efficiency. The increase in efficiency allows a reduction in apparatus size. For example, the electrostatic chamber may be in the region of 100 mm in diameter to 900 mm in length. WESPs are typically used with other abatement apparatus, such as plasma burners, but because of the low efficiency of known WESPs it is common to see a single large inefficient WESP associated with a number of other abatement apparatus. The present gas-dynamic WESP allows a single WESP to be associated with a single plasma burner in one compact design, as shown in FIG. 3 and therefore each plasma torch in a plurality of plasma torches can each be associated with a separate respective highly efficient wet electrostatic precipitator according to one embodiment.

Figure 3:
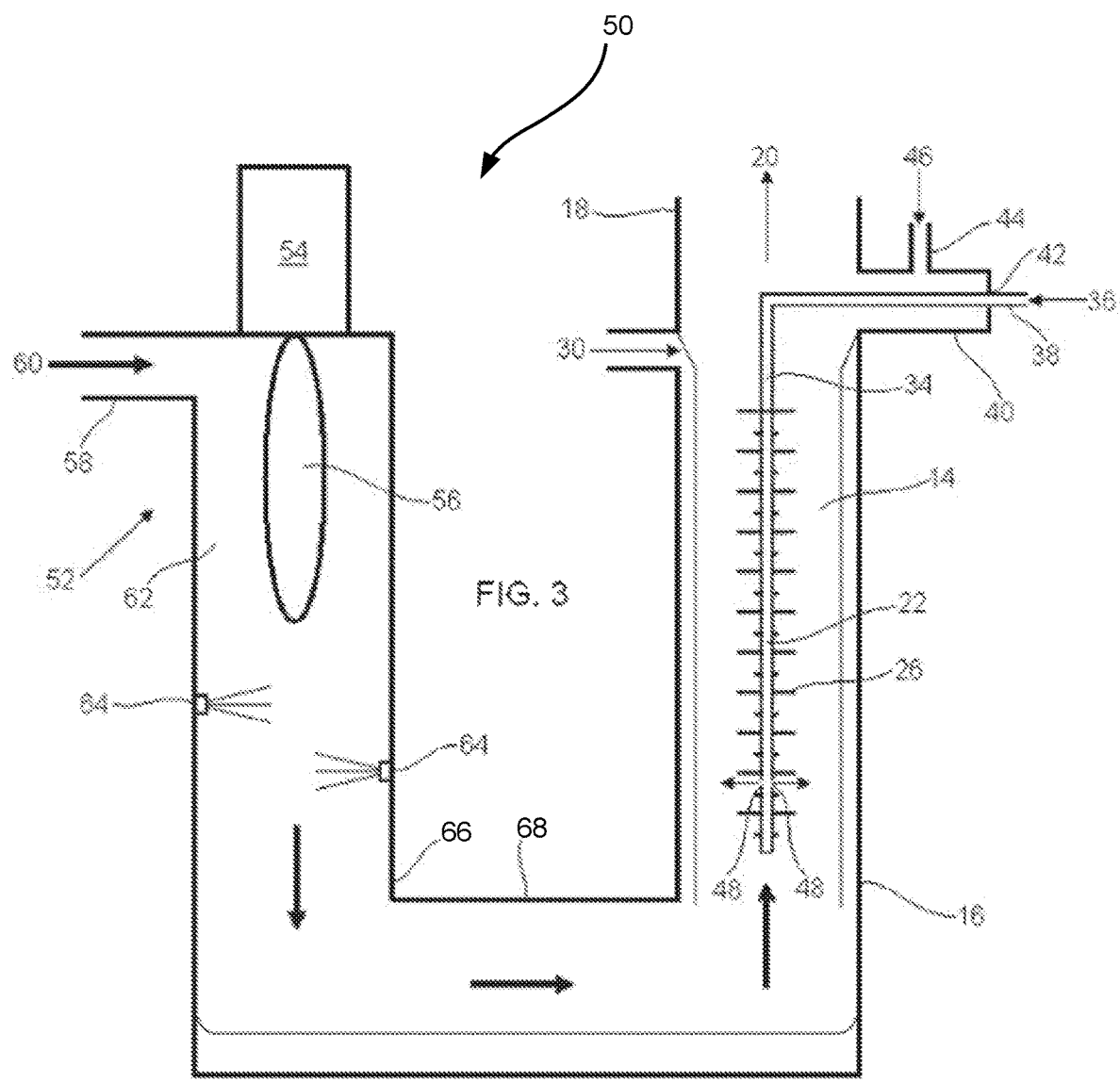
FIG. 3 shows an abatement system comprising the precipitator and a plasma burner according to one embodiment.

Referring to FIG. 3, there is shown an abatement apparatus 50 comprising a plasma burner 52 and the previously described gas-dynamic wet electrostatic precipitator 10.

The burner 52 comprises a plasma generator, or torch, 54 for generating a plasma flare 56. An inlet 58 conveys a gas stream 60 into the burner for at least one of a thermal or chemical reaction, or both, with the flare in a reactor chamber 62 located downstream of the torch. The reactor chamber is generally cylindrical and may be provided with a water weir (not shown) to prevent the accumulation of deposits on an inner surface of the reactor chamber.

One or more spray nozzles 64 may be provided for spraying water or other liquid into the reactor chamber 62 downstream of the plasma flare for cooling the gas stream after it has been exposed to the high plasma temperatures.

An outlet 66 of the plasma burner is connected to the inlet 16 of the WESP by a conduit, or duct, 68 which extends generally orthogonally to the flow paths of the gas stream in the burner and the WESP. The duct 68 also forms a liquid container for at least the temporary storage of liquid which is sprayed into the reactor chamber 62 and for liquid from one or both water weirs, prior to re-circulation or disposal. In this regard, the plasma burner is orientated such that the gas stream flows through the burner generally downwardly, and the precipitator is orientated such that the gas stream flows through the precipitator generally upwardly. These orientations allow the collection of liquid in the conduit 68.

Figure 4:
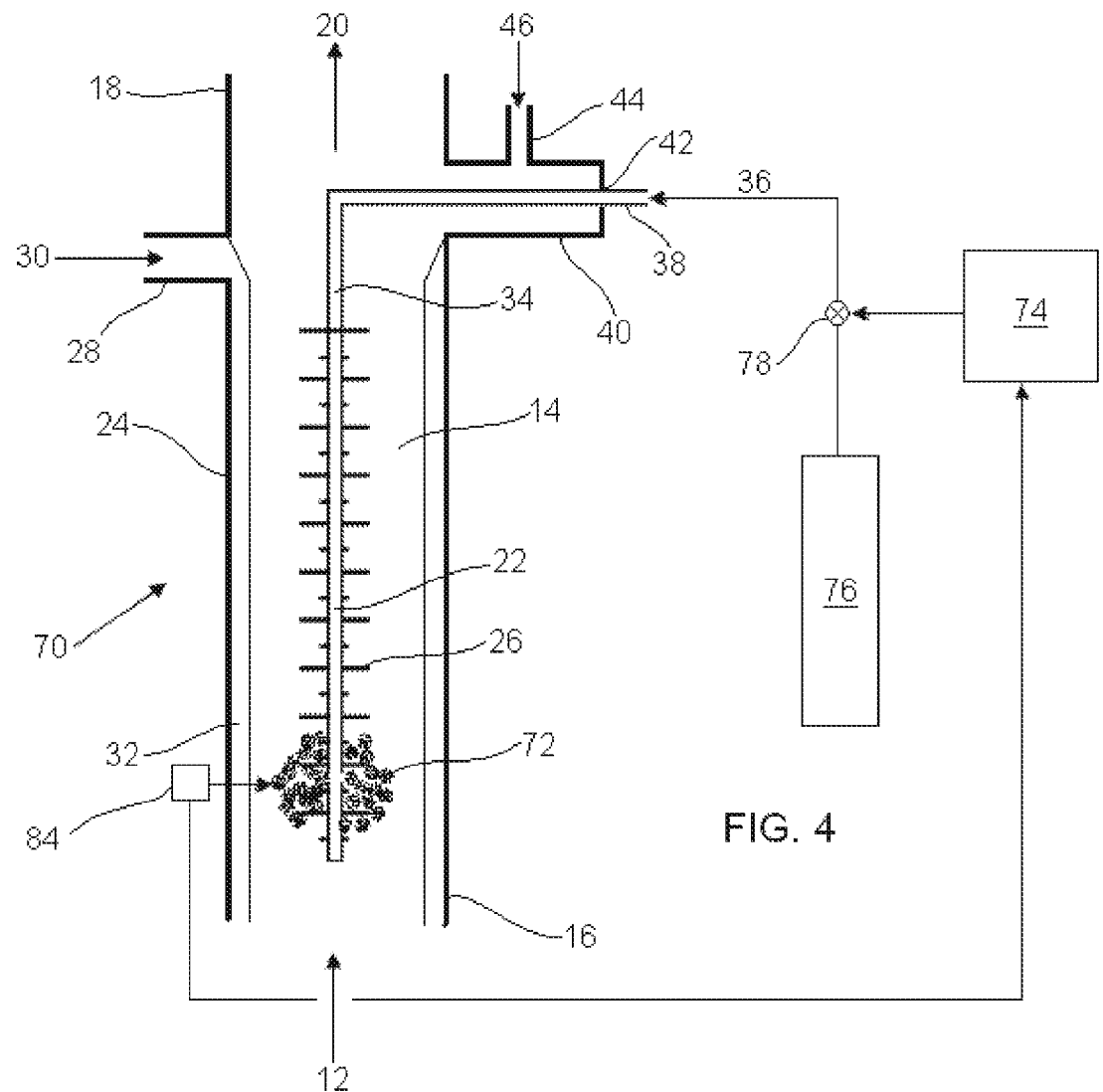
FIGS. 4 to 6 show another wet electrostatic precipitator according to one embodiment.
Figure 5:
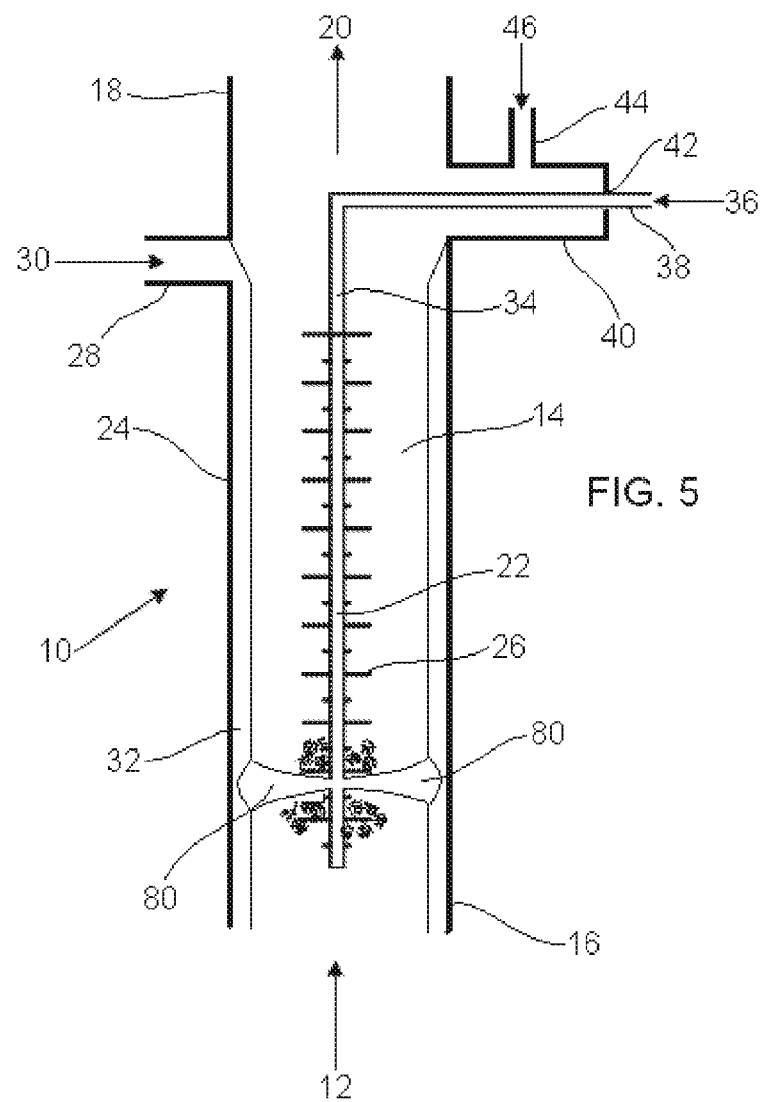
Figure 6:
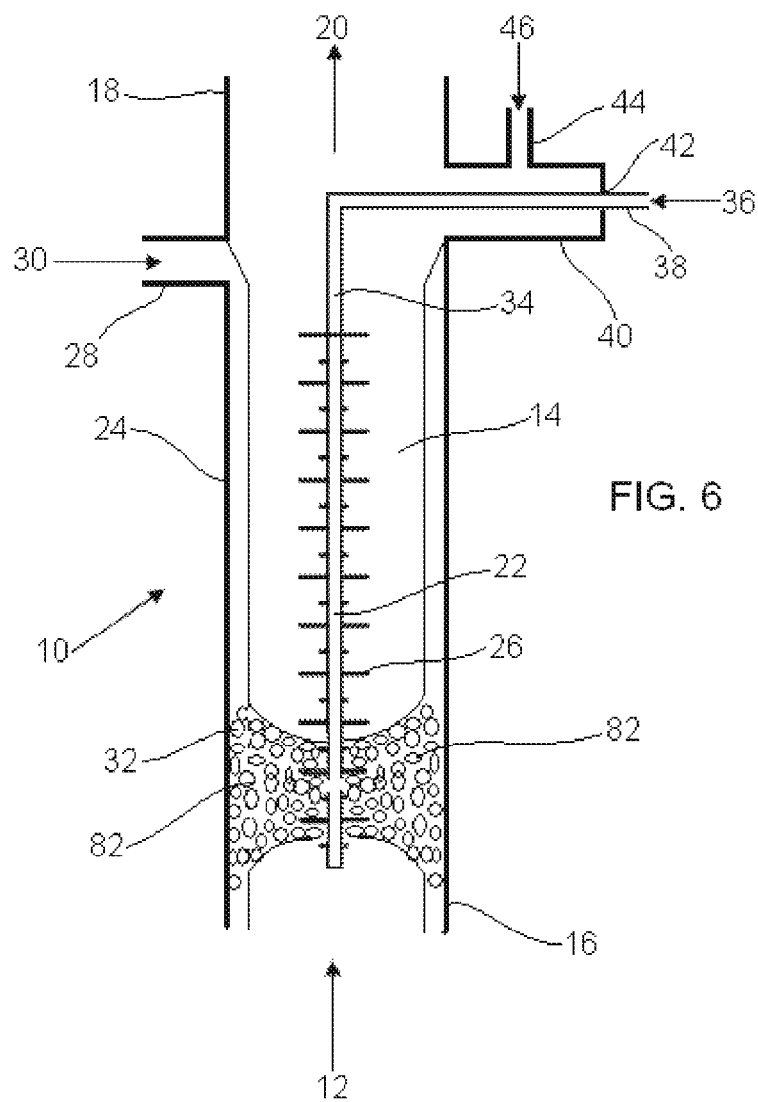
Figure 7:
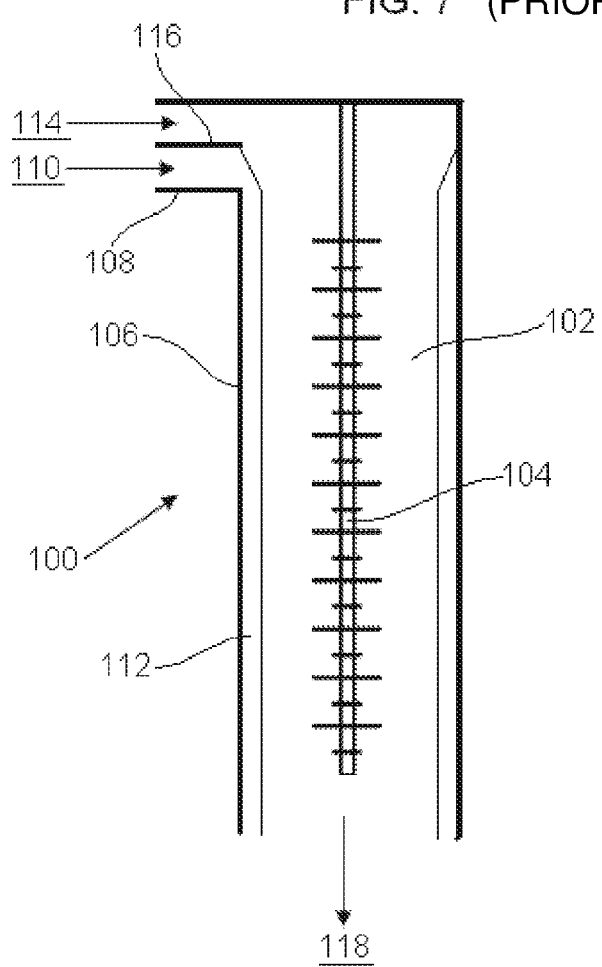
FIG. 7 illustrates a known (prior art) wet electrostatic precipitator.

Another wet electrostatic precipitator 70 is shown in FIGS. 4 to 6 and provides an additional improvement to the precipitator 10 described with reference to FIGS. 1 and 2.

As shown in FIG. 4, solid deposits 72 in the gas stream may accumulate in the region of the opening. Whilst most deposits will be drawn towards the liquid weir in normal use, it has been found that some deposits accumulate on the inner electrode 22. This accumulation typically also occurs in known WESPs, however, the present gas-dynamic WESP may if desired be relatively small compared to known WESPs and therefore if accumulation is allowed to build up to a significant extent, it will at least partially if not fully occlude the electrostatic chamber 14 leading to loss of efficiency or termination of gas treatment. In larger WESPs, accumulation of deposits is tolerated because the electrostatic chamber will not become occluded and loss of efficiency is not so significant. After treatment, when the apparatus is off-line, the known WESPs are cleaned of accumulation manually be an operative. In the present embodiment however, it is desirable to clean the WESP periodically during use.

The precipitator 70 comprises a control 74 configured for controlling the flow of purge gas 36 through the duct 34 of the inner electrode 22. In this arrangement, a source of purge gas 76 contains gas under pressure and a flow control valve 78 is operable by the control to control the flow rate of purge gas through the duct. The arrangement may comprise other alternative ways of controlling the flow of purge gas. In a normal condition of the precipitator, purge gas is conveyed through the duct, of an internal electrode with an external diameter of 6 mm, and the openings at a first flow rate of, for example, between 0.1 and 1 standard liters per minute for directing, or urging, the gas stream to be treated, flowing at between 50 and 150 standard liters per minute, towards the outer electrode, with an internal diameter of 38 mm, and/or disrupting the gas stream. In a second cleaning condition, purge gas is conveyed through the duct at a second higher flow rate of, for example, 10 to 20 standard liters per minute for dislodging deposits accumulated in the region of the openings. FIG. 5 shows the purge gas exiting the openings at the second relatively high flow rate producing jets 80 of purge gas. The jets cause at least some of the deposits to be removed and swept downstream by the gas stream 12. Preferably, the second flow rate is sufficient to cause the jets to perturb the liquid curtain causing turbulent liquid 82 as shown in FIG. 6 such that liquid is urged against the accumulated deposits for removing more of the deposits from the inner electrode. The second flow rate is maintained, or repeatedly pulsed until substantially all of the deposits are removed.

During a second, cleaning, action the flow through 46 inlet for purge gas conveying purge gas to the side passage 40 can be increased to prevent liquid entering the side passage 40, reducing the possibility of parasitic surface discharge and loss of electrostatic field potential through conductive water paths within the side passage. The potential across the two electrodes is also preferably switched off during the second cleaning action.

As shown in FIG. 4, the control is operatively connected to a sensor 84 for sensing the accumulation of deposits and when the accumulation has exceed a predetermined size the control is configured to activate the cleaning condition. The sensor may be a microwave sensor or an optical sensor. Alternatively, the flow rate of the gas stream can be sensed to determine if it has reduced because of partial occlusion by deposits. The size of the accumulation which triggers cleaning can be determined by testing.

It has also been observed that as deposits build up on the central electrode the voltage potential between the inner and outer electrodes decreases leading to impaired efficiency of the precipitator (for a fixed current of, for example, 2.35 mA). Monitoring of this potential voltage across the electrodes enables monitoring of WESP efficiency and allows cleaning to be triggered in response to a drop in electrostatic potential. This enables the second, cleaning, action to take place only when necessary and minimizes the temporary loss in WESP efficiency that occurs during cleaning activity. By reducing the cleaning actions to the minimum necessary disruption to maintain the efficiency of the precipitator.

Alternatively, the control may be configured to activate the second, cleaning, condition at periodic intervals of fro example 30 to 360 seconds selected according to the predetermined rate of accumulation for a given gas stream and gas stream flow rate. The purge gas burst may be maintained for a period of for example 5 seconds.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A wet electrostatic precipitator for treating a gas stream, comprising:
   an electrostatic chamber having an electrostatic chamber inlet through which the gas stream to be treated is conveyed into the electrostatic chamber and an electrostatic chamber outlet through which the treated gas stream is conveyed from the electrostatic chamber, an inner electrode and an outer electrode arranged to produce an electrostatically charged field therebetween when an electrical potential is applied between said inner and outer electrodes, a liquid inlet for conveying liquid into the electrostatic chamber for providing a liquid curtain over an inner surface of the outer electrode, such that particulates in the gas stream become electrically charged when passing through the field and are drawn towards the outer electrode, where the particulates are entrained by the liquid curtain and removed from the gas stream, wherein the inner electrode comprises a conduit through which a purge gas can be conveyed and said inner electrode further comprises at least one opening located towards the electrostatic chamber inlet and arranged to convey the purge gas from the conduit into the electrostatic chamber substantially laterally to the gas stream flowing through the electrostatic chamber; and
   a control configured for controlling a flow of purge gas through the conduit of the inner electrode such that in a first condition the purge gas is conveyed through the conduit at a first flow rate to perform at least one of directing the gas stream towards the outer electrode and disrupting the gas stream, and in a second condition the purge gas is conveyed through the conduit at a second higher flow rate for dislodging deposits accumulated in a region of said at least one opening in the inner electrode; wherein the control is operatively connected to a sensor for sensing the deposits and when the deposits have exceed a predetermined amount the control is configured to activate the second condition.

2. The wet electrostatic precipitator as claimed in claim 1, wherein said at least one opening is arranged to perform at least one of directing the gas stream towards the outer electrode and disrupting the gas stream.

3. The wet electrostatic precipitator as claimed in claim 1, wherein the at least one opening comprises at least two openings for conveying purge gas into the electrostatic chamber in substantially opposing lateral directions.

4. The wet electrostatic precipitator as claimed in claim 1, wherein the electrostatic chamber comprises a side passage containing an end portion of the inner electrode distal from said at least one opening.

5. The wet electrostatic precipitator as claimed in claim 4, wherein the side passage comprises an inlet for conveying purge gas into the side passage for purging the end portion of the inner electrode.

6. The wet electrostatic precipitator as claimed in claim 1, wherein the second higher flow rate is sufficient to perturb the liquid curtain such that liquid is urged against the deposits for removing said deposits.

7. The wet electrostatic precipitator as claimed in claim 1, wherein the sensor senses one of: a change in the electrical potential between the inner and outer electrodes; and a change in a flow of the gas stream through the electrostatic chamber.

8. An abatement system comprising a wet electrostatic precipitator as claimed in claim 1, further comprising a plasma burner causing heat, or chemical, reaction of the gas stream with a plasma flare generated by a plasma torch in a reactor chamber for receiving the gas stream, the reactor chamber located upstream of the precipitator and having an outlet in gas communication with the inlet of the electrostatic chamber for conveying gas which has been plasma treated to the precipitator for further treatment.

9. The abatement system as claimed in claim 8, comprising a second conduit connecting the outlet of the reactor chamber to the inlet of the electrostatic chamber, the second conduit being shaped to contain, at least temporarily, liquid having formed the liquid curtain.

10. The abatement system as claimed in claim 9, wherein the outlet of the reactor chamber comprises at least one spray nozzle for spraying a liquid into the reactor chamber for cooling the gas stream downstream of the plasma flare, the second conduit containing, at least temporarily, liquid which has been sprayed into the reactor chamber.

11. The abatement system as claimed in claim 8, wherein the at least one plasma torch is orientated such that the gas stream flows through the reactor chamber downwardly, and the precipitator is orientated such that the gas stream flows through the precipitator upwardly.

12. The abatement system as claimed in claim 8, wherein the system comprises a plurality of plasma torches each associated with a respective wet electrostatic precipitator.

* * * * *